(12) United States Patent
Jur et al.

(10) Patent No.: US 7,969,750 B2
(45) Date of Patent: Jun. 28, 2011

(54) ELECTRICAL ENCLOSURE AND SUPPORT ASSEMBLY THEREFOR

(75) Inventors: Arthur J. Jur, Greenwood, SC (US); Phillip D. Miller, Greenwood, SC (US); Douglas V. Taylor, Greenwood, SC (US)

(73) Assignee: Eaton Corporation, Cleveland, OH (US)

( * ) Notice: Subject to any disclaimer, the term of this patent is extended or adjusted under 35 U.S.C. 154(b) by 815 days.

(21) Appl. No.: 12/025,079

(22) Filed: Feb. 4, 2008

(65) Prior Publication Data

US 2009/0196012 A1  Aug. 6, 2009

(51) Int. Cl.
  *H02B 1/40* (2006.01)
(52) U.S. Cl. ........................................ 361/825; 361/807
(58) Field of Classification Search .................. 361/825, 361/829, 807, 809
  See application file for complete search history.

(56) References Cited

U.S. PATENT DOCUMENTS

| | | | | |
|---|---|---|---|---|
| 4,672,511 A | * | 6/1987 | Meusel et al. | 361/802 |
| 5,043,847 A | * | 8/1991 | Deinhardt et al. | 361/736 |
| 5,249,979 A | * | 10/1993 | Deinhardt et al. | 439/341 |
| 6,456,495 B1 | * | 9/2002 | Wieloch et al. | 361/729 |
| 6,654,255 B2 | * | 11/2003 | Kruse et al. | 361/799 |
| 7,049,516 B1 | | 5/2006 | Haag et al. | |
| 7,091,417 B1 | | 8/2006 | Jur et al. | |
| 7,367,830 B2 | * | 5/2008 | Jur et al. | 439/212 |

* cited by examiner

*Primary Examiner* — Dameon E Levi
(74) *Attorney, Agent, or Firm* — Martin J. Moran

(57) ABSTRACT

A support assembly is provided for supporting an electrical enclosure with respect to an electrical busway and with respect to a support structure, such as a wall, which is disposed proximate to the electrical busway. The support assembly includes at least one mounting assembly having a plurality of mounting elements. A first one of the mounting elements is coupled to the electrical enclosure. A second different one of the mounting elements is coupled to the support structure. A number of coupling assemblies interconnect the mounting elements. The first one of the mounting elements is movable with respect to the second different one of the mounting elements, in order to enable the electrical enclosure to move with the electrical busway and with respect to the support structure.

18 Claims, 4 Drawing Sheets

ELECTRICAL ENCLOSURE AND SUPPORT ASSEMBLY THEREFOR

BACKGROUND OF THE INVENTION

1. Field of the Invention

The invention relates generally to electrical enclosures and, more particularly, to electrical enclosures that are coupled to electrical busways. The invention also relates to support assemblies for electrical enclosures.

2. Background Information

Electrical switching apparatus used in power distribution systems are often mounted within an electrical enclosure (e.g., without limitation, a panelboard; a load center; a meter center) either individually or in combination with other switchgear (e.g., without limitation, circuit switching devices and circuit interrupters such as circuit breakers, contactors, motor starters, motor controllers and other load controllers).

The electrical enclosure is typically coupled to, and supported by, a structure such as, for example, a wall or an electrical busway. Electrical power is supplied to electrical equipment housed by the electrical enclosure from a plurality of electrical conductors. When an electrical busway is employed, the electrical conductors are typically disposed within an elongated rail structure. The electrical enclosure is mechanically coupled to the elongated rail structure. The electrical equipment housed within the electrical enclosure is electrically connected to the electrical conductors of the electrical busway using suitable electrical connectors.

Some known electrical enclosures are supported exclusively by the electrical busway. Among other disadvantages, such designs are limited by the size and/or weight of the electrical enclosure. For example, a relatively large or relatively heavy electrical enclosure could place an excessive bending moment and associated stress on the electrical busway and associated hardware (e.g., without limitation, clamps; brackets; fasteners), as well as on the electrical connections between the electrical busway and electrical equipment housed within the electrical enclosure.

In an attempt to overcome this structural limitation, one prior proposal attached hangers from an overhead structure (e.g., without limitation, the ceiling; rafters of a building). However, this proposal is limited by overhead obstructions and/or by the amount of weight the overhead structure is capable of supporting.

Another prior proposal rigidly mounted the electrical enclosure to a nearby structure (e.g., without limitation, a wall), using suitable mechanical hardware (e.g., without limitation, clamps; brackets; fasteners). However, mounting the electrical enclosure in a rigid, fixed position on the wall does not allow it to move with the electrical busway. Accordingly, if such busway moves, the hardware coupling the electrical enclosure to the busway and/or the electrical connections between the busway and electrical components housed within the electrical enclosure, can be undesirably subjected to excessive forces and stress.

Another problem relating to proper support of the electrical enclosure is that minimal space is available between the back of such enclosure and the wall or other suitable structure to which the enclosure is to be mounted. It is, therefore, difficult to secure the enclosure to the wall or structure, particularly after it has already been coupled to the electrical busway.

There is room, therefore, for improvement in electrical enclosures such as, for example, load centers. There is also room for improvement in support assemblies for electrical enclosures.

SUMMARY OF THE INVENTION

These needs and others are met by embodiments of the invention, which are directed to a support assembly for an electrical enclosure that is coupled to an electrical busway. The support assembly permits the electrical enclosure to be coupled to a wall or other suitable support structure after the electrical enclosure has been coupled to the electrical busway, yet allows the electrical enclosure to move with the electrical busway.

As one aspect of the invention, a support assembly is provided for supporting an electrical enclosure with respect to an electrical busway and with respect to a support structure. The support structure is disposed proximate to the electrical busway. The support assembly comprises: at least one mounting assembly comprising a plurality of mounting elements, a first one of the mounting elements being structured to be coupled to the electrical enclosure, a second different one of the mounting elements being structured to be coupled to the support structure; and a number of coupling assemblies interconnecting the first one of the mounting elements and the second different one of the mounting elements. The first one of the mounting elements is structured to be movable with respect to the second different one of the mounting elements, in order to enable the electrical enclosure to move with the electrical busway and with respect to the support structure.

The plurality of mounting elements of the at least one mounting assembly may be a first bracket and a second bracket, wherein each of the first bracket and the second bracket has an attachment portion and at least one flange extending outwardly from the attachment portion. The attachment portion of the first bracket may be structured to be coupled to the electrical enclosure, and the at least one flange of the first bracket may be structured to extend away from the electrical enclosure. The attachment portion of the second bracket may be structured to be coupled to the support structure, and the at least one flange of the second bracket may be structured to extend away from the support structure. The first bracket and the second bracket may be substantially identical.

The number of coupling assemblies may be a number of spring assemblies, wherein each of the number of spring assemblies comprises an elongated member and a resilient element. The elongated member may have a first end and a second end disposed opposite and distal from the first end, wherein the first end of the elongated member is fixedly coupled to a corresponding one of the at least one flange of the second bracket, and wherein the second end of the elongated member is movably coupled to the at least one flange of the first bracket. The resilient element may be disposed proximate the second end of the elongated member at or about the at least one flange of the first bracket. The resilient element may be a spring having a number of coils, wherein the second end of the elongated member extends through the coils, and wherein the spring is biased against such flange of the first bracket. The at least one flange of the first bracket may be a first flange and a second flange, and the at least one flange of the second bracket may be a third flange and a fourth flange. The number of spring assemblies may be a first spring assembly and a second spring assembly, wherein the first spring assembly includes a first elongated member and a first spring, and wherein the second spring assembly includes a second elongated member and a second spring. Each of the first elongated member and the second elongated member may extend through the first flange, the second flange, the third flange, and the fourth flange. The first end of the first elongated member and the first end of the second elongated member may be coupled to the fourth flange. The first spring may be disposed on the first elongated member between the first flange and the second flange, and the second spring may be disposed on the second elongated member between the first flange and the second flange.

As another aspect of the invention, an electrical enclosure is coupled to an electrical busway and a support structure. The electrical enclosure comprises: a housing including a first end, a second end disposed opposite and distal from the first end, a first side, a second side disposed opposite and distal from the first side, a first edge and a second edge disposed opposite the first edge; a number of coupling elements structured to couple the first edge of the housing to the electrical busway; and a support assembly comprising: at least one mounting assembly comprising a plurality of mounting elements, a first one of the mounting elements being coupled to the second side of the housing, a second different one of the mounting elements being structured to be coupled to the support structure, and a number of coupling assemblies interconnecting the first one of the mounting elements and the second different one of the mounting elements. The first one of the mounting elements is structured to be movable with respect to the second different one of the mounting elements, in order to enable the electrical enclosure to move with the electrical busway and with respect to the support structure.

The at least one mounting assembly may be a first mounting assembly and a second mounting assembly. The first one of the mounting elements of the first mounting assembly may be coupled to the second side of the housing at or about the first end of the housing, and the first one of the mounting elements of the second mounting assembly may be coupled to the second side of the housing at or about the second end of the housing. The first mounting assembly and the second mounting assembly may be substantially identical.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
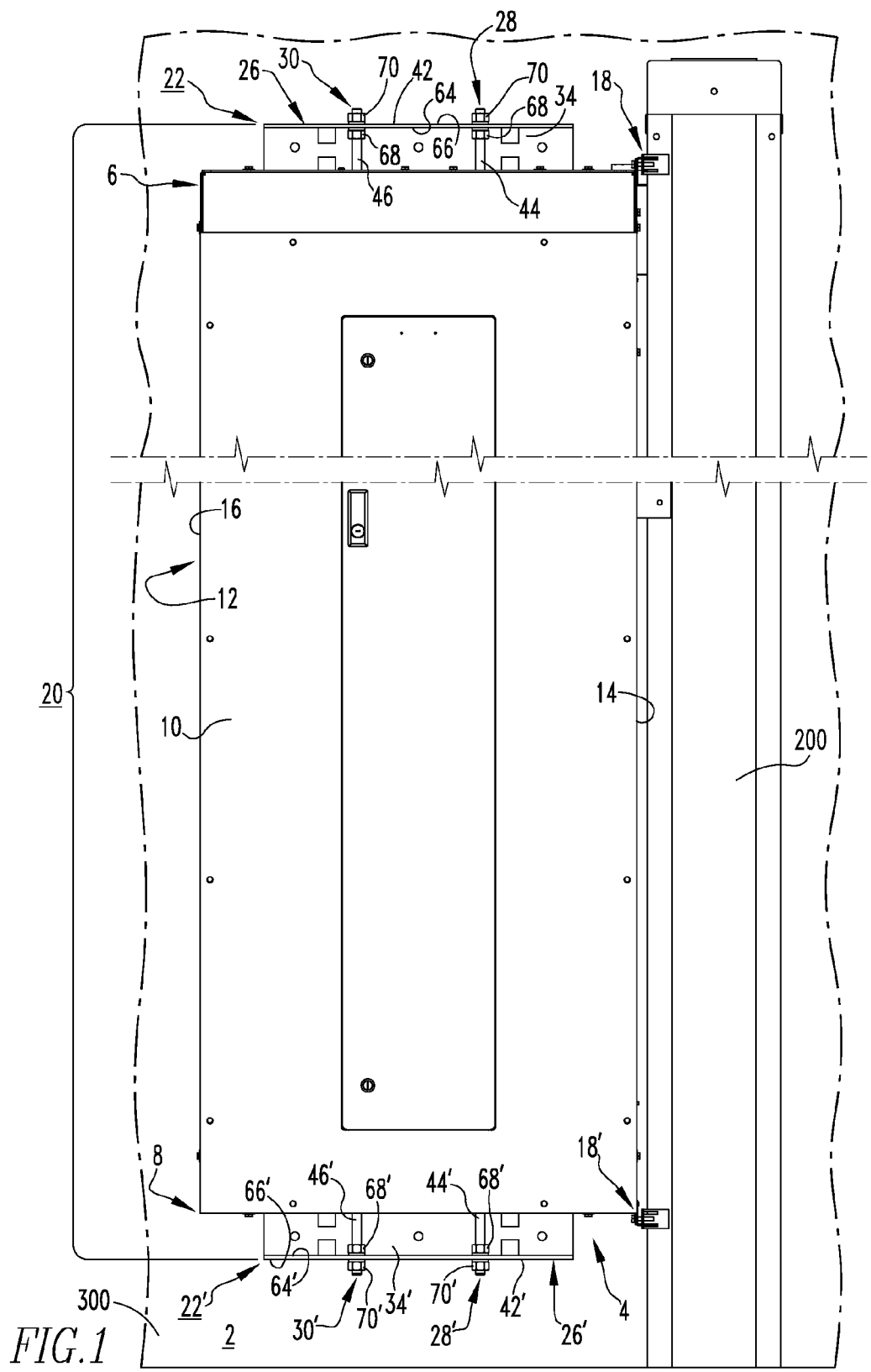
FIG. 1 is a sectioned front elevation view of an electrical enclosure and support assembly therefor, in accordance with an embodiment of the invention.

For purposes of illustration, embodiments of the invention will be described as applied to a load center, which is supported with respect to an electrical busway and a wall, although it will become apparent that they could also be applied to support any other known or suitable electrical enclosure (e.g., without limitation, a panelboard; a meter center) and electrical switching apparatus (e.g., without limitation, circuit switching devices and circuit interrupters such as circuit breakers, contactors, motor starters, motor controllers and other load controllers) housed therein, with respect to any known or suitable structure other than a wall (e.g., without limitation, a mounting pedestal).

Directional phrases used herein, such as, for example, left, right, front, back, top, bottom and derivatives thereof, relate to the orientation of the elements shown in the drawings and are not limiting upon the claims unless expressly recited therein.

As employed herein, the term "electrical bus" or "electrical bus member" means a substantially rigid conductor which carries or transfers voltage, current and/or power.

As employed herein, the term "electrical busway" refers to an assembly of electrical bus members housed within an elongated supporting structure such as, for example and without limitation, a rail structure. The electrical bus members receive electrical power from, for example, a utility or other suitable power source. The rail structure provides a supporting assembly and housing for the electrical bus members, and further provides a suitable structure for mechanical attachment and support of the electrical enclosure.

As employed herein, the terms "fastener" and "fastening mechanism" refer to any suitable connecting or tightening mechanism expressly including, but not limited to, screws, bolts, nuts (e.g., without limitation, lock nuts) and combinations thereof.

As employed herein, the statement that two or more parts are "coupled" together shall mean that the parts are joined together either directly or joined through one or more intermediate parts.

As employed herein, the term "number" refers to the quantity one or an integer greater than one (i.e., a plurality).

FIG. 1 shows a support assembly 20 for supporting an electrical enclosure such as, for example, a load center 2 (shown in section view in FIG. 1 for simplicity of illustration), with respect to an electrical busway 200 (partially shown in section view in FIG. 1 for simplicity of illustration) and with respect to a support structure such as, for example and without limitation, a wall 300 (partially shown in phantom line drawing in FIG. 1).

Figure 3:
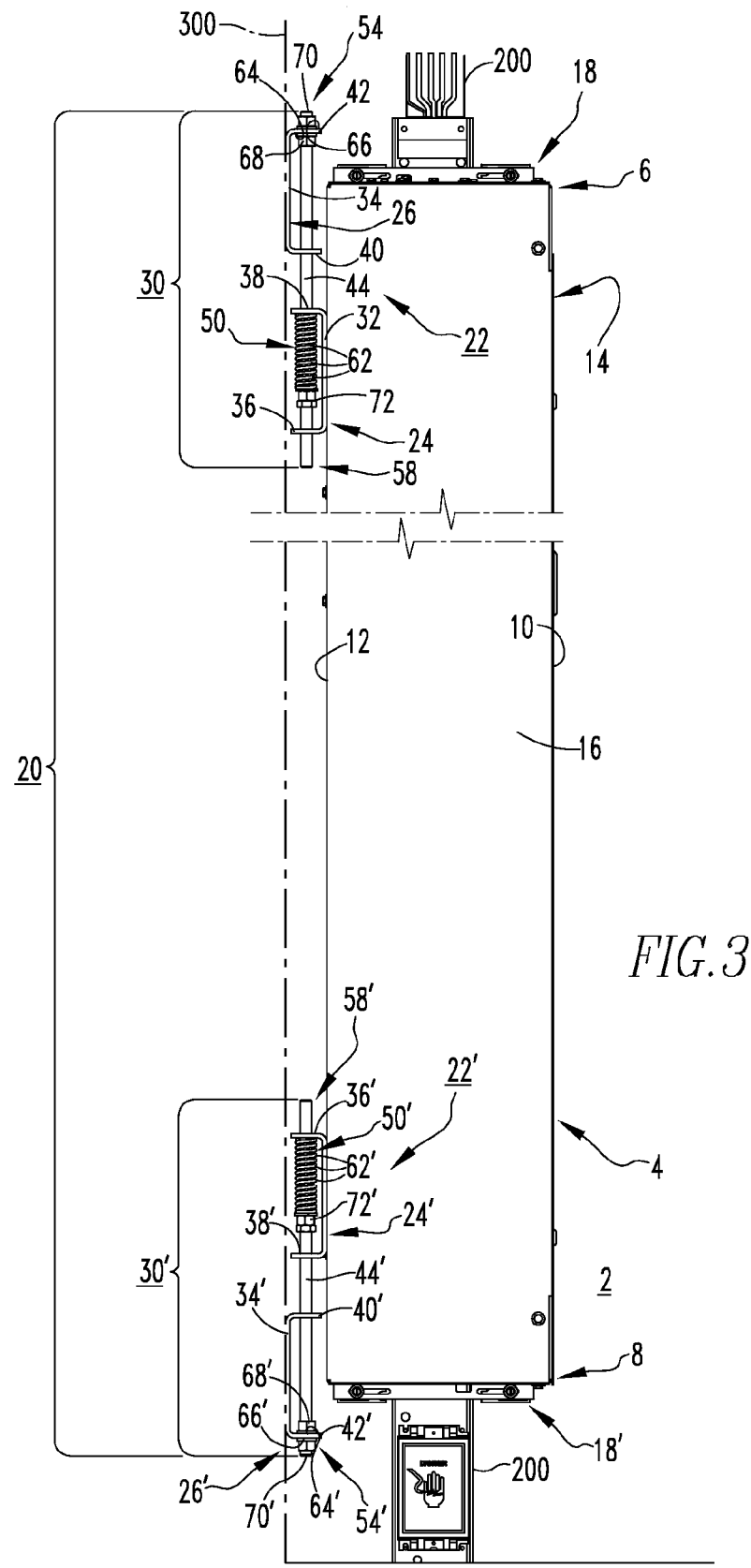
FIG. 3 is a sectioned side elevation view of the electrical enclosure and support assembly of FIG. 2.
Figure 4:
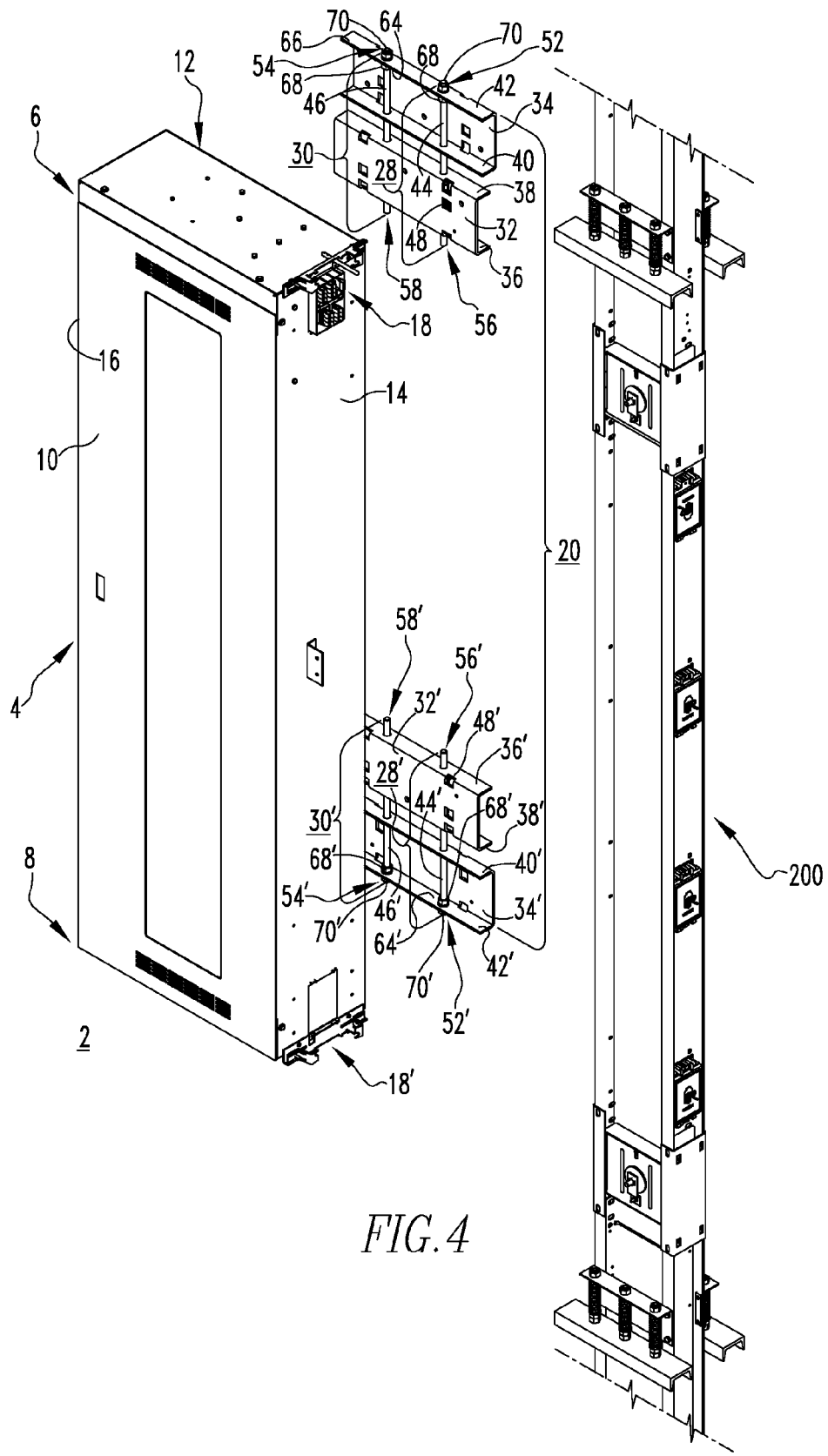
FIG. 4 is an exploded isometric view of the electrical enclosure and support assembly of FIG. 3.

The example electrical enclosure 2 includes a housing 4 having a first end 6, a second end 8 disposed opposite and distal from the first end 6, first and second opposing sides 10,12, and first and second opposing edges 14,16 (e.g., left and right sides from the perspective of FIG. 1; see also FIG. 4). A number of coupling elements 18,18' extend outwardly from the electrical enclosure housing 4 and are structured to suitably mechanically couple and/or electrically connect the electrical enclosure 2 to the electrical busway 200, in a generally well known manner. As best shown in FIG. 4, the example electrical enclosure 2 includes a first coupling element 18 extending outwardly from the first edge 14 (e.g., right side, from the perspective of FIG. 4) of the electrical enclosure housing 4 at or about the first end 6 thereof, and a second coupling element 18', which also extends outwardly from the first edge 14 of the housing 4, at or about the second end thereof. It will, however, be appreciated that any known or suitable alternative number and/or configuration (not shown) of coupling elements (e.g., 18,18') could be employed in any suitable number and/or location, without departing from the scope of the invention. It will also be appreciated that although the first edge 14 (e.g., right side, from the perspectives of FIGS. 1 and 4) of the electrical enclosure housing 4 is structured to be disposed opposite the electrical busway 200 and generally perpendicular with respect to the support structure 300 (e.g., wall), as shown in FIGS. 1 and 3, the electrical enclosure housing 4 could be disposed in any known or suitable alternative configuration (not shown) with respect to the electrical busway 200 and/or the wall 300 or other suitable support structure.

Figure 2:
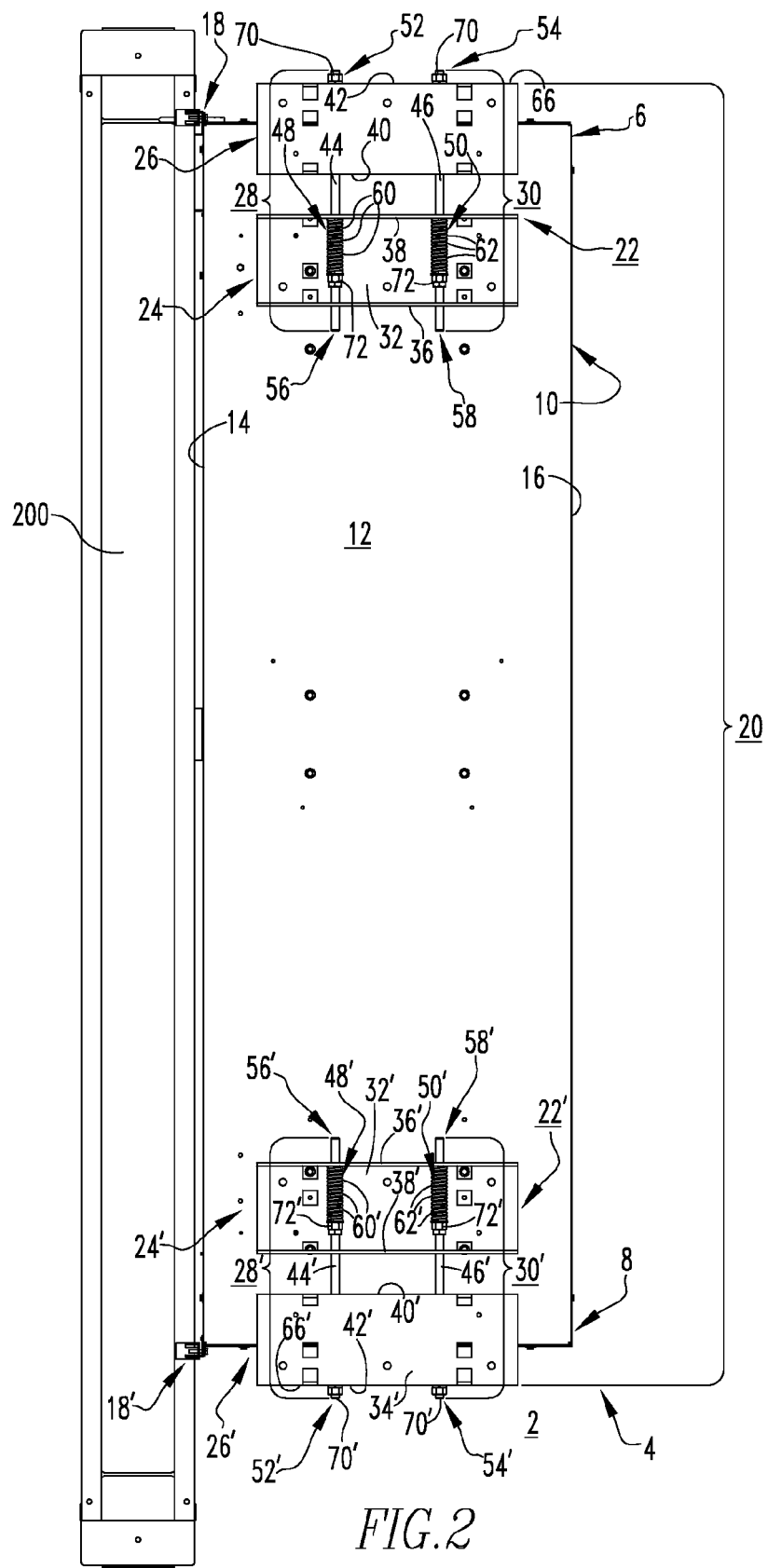
FIG. 2 is a back elevation view of the electrical enclosure and support assembly of FIG. 1.

As shown in FIGS. 2 and 3, the space between the electrical enclosure housing 4 and electrical busway 200, and between the electrical enclosure housing 4 (e.g., second side 12 of housing 4 of FIG. 3) and the wall 300 (FIG. 3), respectively, is very limited, making it difficult to suitably connect the electrical enclosure 2 to both structures. As will be described hereinbelow, the disclosed support assembly 20 addresses and overcomes this potential problem by enabling the electrical enclosure 2 to be coupled first to the electrical busway 200, and then to the wall 300 (FIG. 3). It also enables the electrical enclosure 2 to move with the electrical busway 200, and with respect to the wall 300 (FIG. 3).

Specifically, as shown in FIGS. 2 and 4, the support assembly 20 includes at least one mounting assembly 22,22'. The example support assembly 20 includes a first mounting assembly 22 coupled to the second side 12 of the electrical enclosure housing 4, at or about the first end 6 thereof, and a second mounting assembly 22' coupled to the second side 12 of the housing 4, at or about the second end 8 thereof. It will, however, be appreciated that the support assembly 20 could have any known or suitable alternative number and/or configuration of mounting assemblies (e.g., 22,22'), without departing from the scope of the invention. Although not required, the first and second mounting assemblies 22,22' shown and described herein, are substantially identical. Thus, for economy of disclosure, only one mounting assembly 22 of the support assembly 20 will be described, in detail. The components of the second mounting assembly 22' are numbered substantially similarly to their counterpart like components of the first mounting assembly 22, but include a prime symbol. For instance, the example first mounting assembly 22 includes a first mounting element 24 and a second mounting element 26, whereas the first and second mounting elements of the second mounting assembly 22' are numbered 24' and 26'. The first mounting element 24 is coupled to the second side 12 of the electrical enclosure housing 4, and the second mounting element 26 is coupled to the wall 300, as shown in simplified form in FIG. 3. A number of coupling assemblies 28,30 (two are shown) interconnect the first and second mounting elements 24,26, and enable the first mounting element 24 to be movable with respect to the second mounting element 26 such that the electrical enclosure 2 is movable with the electrical busway 200 and with respect to the wall 300. More specifically, the first and second mounting elements 24,26 of the example support assembly 20 are first and second substantially identical brackets 24,26. The first bracket 24 has an attachment portion 32 for coupling the bracket 24 to the second side 12 of the electrical enclosure housing 4, as previously noted, and further includes first and second flanges 36,38. The first and second flanges 36,38 extend outwardly from the attachment portion 32 away from the electrical enclosure housing 4 and toward the wall 300, as best shown in FIG. 3. Similarly, the second bracket 26 includes attachment portion 34, which is attached to wall 300, and includes outwardly extending third and fourth flanges 40,42, the third and fourth flanges extend away from the wall 300 and toward the electrical enclosure housing 4, as shown in FIG. 3. Accordingly, the brackets 24,26 are mounted in reverse with respect to one another, as best shown in FIG. 3.

Referring again to FIG. 2, the first and second spring assemblies 28 and 30 respectively include first and second elongated members 44 and 46 and first and second resilient elements 48 and 50 (e.g., springs, without limitation). The first ends 52 and 54 of the first and second elongated members 44 and 46 are respectively fixedly coupled to the fourth flange 42 of the second bracket 26, and the second ends 56 and 58 of the first and second elongated members 44 and 46 are respectively movably coupled to the second flange 38 of the first bracket 26. The first and second springs 48 and 50 are disposed proximate the second ends 56 and 58 of the first and second elongated members 44 and 46, respectively. Specifically, the example springs 48,50 have coils 60,62, wherein the second ends 56 and 58 of the first and second elongated members 44 and 46 extend through the coils 60 and 62 of springs 48 and 50, respectively. The first and second springs 48,50 are, therefore, disposed between the first and second flanges 36,38 of the first bracket 24, as shown.

The spring assemblies 28,30 further include a plurality of fastening mechanisms such as, for example and without limitation, a plurality of nuts 68,70,72 (all shown in FIG. 3). In the example of FIG. 3, a first nut 68 threadingly engages the elongated member 44 of the spring assembly 30 on the first side 64 of the fourth flange 42 of the second bracket 26, and a second nut 70 threadingly engages the elongated member 44 on the second side 66 of the fourth flange 42, thereby fixedly coupling the first end 54 of the elongated member 44 to the fourth flange 42. A third nut 72 threadingly engages the elongated member 44 adjacent the spring 50, and is adjustable toward and away from the spring 50, in order to pre-load the spring 50 against the second flange 38 of the first bracket 24. The other spring assemblies 28,28',30' (all shown in FIG. 2) of the example support assembly 20 are structured substantially similarly to spring assembly 30. It will, however, be appreciated that the brackets 24,24',26,26' of the spring assemblies 28,28',30,30' could have any known or suitable alternative number and/or configuration of flanges (e.g., 36,36',38,38',40,40',42,42'), fastening mechanisms (e.g., 68,70,72), and/or springs (e.g., 48,48',50,50'), without departing from the scope of the invention.

The only distinction between the first mounting assembly 22 and second mounting assembly 22' of the example supporting assembly 20, is that the second mounting assembly 22' is mounted in an inverted configuration with respect to the first mounting assembly 22. Specifically, as best shown in FIG. 3, the springs 48',50' (only spring 50' is shown in FIG. 3) of the second mounting assembly 22' are biased by nuts 72' against the first flange 36' of the first bracket 24', rather than being biased against the second flange 38 of the first bracket 24 as in the first mounting assembly 22.

Among the advantages of the disclosed support assembly 20, are that the springs 48,48',50,50' (all shown in FIG. 2) can be pre-loaded to accommodate any potential vertical movement between the electrical busway 200 and the electrical enclosure 2, thereby minimizing the stress to which the mechanical (e.g., without limitation, coupling elements 18,18') and electrical (not shown) connections between the electrical enclosure 2 and electrical busway 200 are subjected. It also allows the assembly to be configured (e.g., pre-loaded) in a manner that is proportional to the weight of the electrical enclosure 2. Thus, it can be readily employed with a wide variety of different electrical enclosures (e.g., 2). A further advantage relates to the mounting location of the second bracket 26 of the first mounting assembly 22, which is coupled to the wall 300 above the first bracket 24 of the first mounting assembly 22, and the mounting location of the second mounting element 26' of the second mounting assembly 22', which is coupled to the wall 300 below the first mounting element 24' of the second mounting assembly 22'. Specifically, this configuration enables the first brackets 24,24' of the support assembly 20 to be coupled to the electrical enclosure housing 4, before the electrical enclosure 2 is coupled to the electrical busway 200, and then to the wall 300, by way of the second brackets 26,26' of the support assembly 20. In particular, as best shown in the side elevation view of FIG. 3, because the fourth flange 42 of the second bracket 26 of the first mounting assembly 22 is disposed above (e.g., from the perspective of FIG. 3) the first end 6 (e.g., top, from the perspective of FIG. 3) of the electrical enclosure housing 4, at least a portion of the attachment portion 34 of the second bracket 26 is accessible to be attached to the wall 300, and the fourth flange 42 of the second bracket 26 is accessible to attach to elongated member 44 thereto using the first and second nuts 68,70. Similarly, at least a portion of the mounting portion 34' of the second bracket 26' and the fourth flange 42' of the second bracket 26' are disposed below (e.g., from the perspective of FIG. 3) the second end 8 (e.g., bottom, from the perspective of FIG. 3) of the electrical enclosure housing 4 and, therefore, are readily accessible. Thus, in operation, the first brackets 24 and 24' of the first and second mounting assemblies 22 and 22', respectively, can be attached to the second side 12 of the electrical enclosure housing 4 and be appropriately pre-loaded, before the electrical enclosure 2 is coupled to the electrical busway 200 and subsequently attached to the wall 300.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A support assembly for supporting an electrical enclosure with respect to an electrical busway and with respect to a support structure, said support structure being disposed proximate to said electrical busway, said support assembly comprising:
    at least one mounting assembly comprising a plurality of mounting elements, a first one of said mounting elements being structured to be coupled to said electrical enclosure, a second different one of said mounting elements being structured to be coupled to said support structure; and a number of coupling assemblies interconnecting said first one of said mounting elements and said second different one of said mounting elements, wherein said first one of said mounting elements is structured to be movable with respect to said second different one of said mounting elements, in order to enable said electrical enclosure to move with said electrical busway and with respect to said support structure, wherein said plurality of mounting elements of said at least one mounting assembly is a first bracket and a second bracket; wherein each of said first bracket and said second bracket has an attachment portion and at least one flange extending outwardly from said attachment portion; wherein the attachment portion of said first bracket is structured to be coupled to said electrical enclosure; wherein said at least one flange of said first bracket is structured to extend away from said electrical enclosure; wherein the attachment portion of said second bracket is structured to be coupled to said support structure; and wherein said at least one flange of said second bracket is structured to extend away from said support structure.

2. The support assembly of claim 1 wherein said first bracket and said second bracket are substantially identical.

3. The support assembly of claim 1 wherein said number of coupling assemblies is a number of spring assemblies; wherein each of said number of spring assemblies comprises an elongated member and a resilient element; wherein said elongated member has a first end and a second end disposed opposite and distal from the first end; wherein the first end of said elongated member is fixedly coupled to a corresponding one of said at least one flange of said second bracket; wherein the second end of said elongated member is movably coupled to said at least one flange of said first bracket; and wherein said resilient element is disposed proximate the second end of said elongated member at or about said at least one flange of said first bracket.

4. The support assembly of claim 3 wherein said resilient element is a spring;
    wherein said spring has a number of coils; wherein the second end of said elongated member extends through said coils; and wherein said spring is biased against a corresponding one of said at least one flange of said first bracket.

5. The support assembly of claim 4 wherein said corresponding one of said at least one flange of said second bracket has a first side and a second side; wherein each of said number of spring assemblies further comprises a plurality of fastening mechanisms; wherein a first one of said plurality of fastening mechanisms threadingly engages said elongated member of said spring assembly on the first side of said corresponding one of said at least one flange of said second bracket; wherein a second one of said plurality of fastening mechanisms threadingly engages said elongated member on the second side of said corresponding one of said at least one flange of said second bracket; wherein a third one of said plurality of fastening mechanisms threadingly engages said elongated member adjacent said spring; and wherein said third one of said plurality of fastening mechanisms is adjustable toward and away from said corresponding one of said at least one flange of said first bracket and said spring, in order to pre-load said spring.

6. The support assembly of claim 3 wherein said at least one flange of said first bracket is a first flange and a second flange; wherein said at least one flange of said second bracket is a third flange and a fourth flange; and wherein said number of spring assemblies is a first spring assembly and a second spring assembly.

7. The support assembly of claim 6 wherein said first spring assembly includes a first elongated member and a first spring; wherein said second spring assembly includes a second elongated member and a second spring; wherein each of said first elongated member and said second elongated member extends through said first flange, said second flange, said third flange, and said fourth flange; wherein the first end of said first elongated member is fastened to said fourth flange; wherein the first end of said second elongated member is coupled to said fourth flange; wherein said first spring is disposed on said first elongated member between said first flange and said second flange; and wherein said second spring is disposed on said second elongated member between said first flange and said second flange.

8. The support assembly of claim 1 wherein said electrical enclosure has a first portion and a second portion; and wherein said at least one mounting assembly is a first mounting assembly structured to be coupled to the first portion of said electrical enclosure, and a second mounting assembly structured to be coupled to the second portion of said electrical enclosure.

9. The support assembly of claim 8 wherein said first mounting assembly and said second mounting assembly are substantially identical.

10. An electrical enclosure coupled to an electrical busway and a support structure, said electrical enclosure comprising:
    a housing including a first end, a second end disposed opposite and distal from the first end, a first side, a second side disposed opposite and distal from the first side, a first edge and a second edge disposed opposite the first edge; a number of coupling elements structured to couple the first edge of said housing to said electrical busway; and a support assembly comprising:

at least one mounting assembly comprising a plurality of mounting elements, a first one of said mounting elements being coupled to the second side of said housing, a second different one of said mounting elements being structured to be coupled to said support structure, and a number of coupling assemblies interconnecting said first one of said mounting elements and said second different one of said mounting elements, wherein said first one of said mounting elements is structured to be movable with respect to said second different one of said mounting elements, in order to enable said electrical enclosure to move with said electrical busway and with respect to said support structure, wherein said plurality of mounting elements of said at least one mounting assembly is a first bracket and a second bracket; wherein each of said first bracket and said second bracket has an attachment portion and at least one flange extending outwardly from said attachment portion; wherein the attachment portion of said first bracket is coupled to the second side of said housing; wherein said at least one flange of said first bracket extends away from said housing; wherein the attachment portion of said second bracket is structured to be coupled to said support structure; and wherein said at least one flange of said second bracket is structured to extend away from said support structure.

11. The electrical enclosure of claim 1 wherein said first bracket and said second bracket are substantially identical.

12. The electrical enclosure of claim 1 wherein said number of coupling assemblies of said at least one mounting assembly is a number of spring assemblies; wherein each of said number of spring assemblies comprises an elongated member and a resilient element; wherein said elongated member has a first end and a second end disposed opposite and distal from the first end of said elongated member; wherein the first end of said elongated member is fixedly coupled to a corresponding one of said at least one flange of said second bracket; wherein the second end of said elongated member is movably coupled to said at least one flange of said first bracket; and wherein said resilient element is disposed proximate the second end of said elongated member at or about said at least one flange of said first bracket.

13. The electrical enclosure of claim 12 wherein said resilient element is a spring; wherein said spring has a number of coils; wherein the second end of said elongated member extends through said coils; wherein each of said spring assemblies further comprises a plurality of fastening mechanisms; wherein a corresponding one of said plurality of fastening mechanisms is adjustable toward and away from said corresponding one of said at least one flange of said first bracket and said spring, in order to pre-load said spring.

14. The electrical enclosure of claim 12 wherein said at least one flange of said first bracket is a first flange and a second flange; wherein said at least one flange of said second bracket is a third flange and a fourth flange; wherein said number of spring assemblies is a first spring assembly and a second spring assembly; wherein said first spring assembly includes a first elongated member and a first spring; wherein said second spring assembly includes a second elongated member and a second spring; wherein each of said first elongated member and said second elongated member extends through said first flange, said second flange, said third flange, and said fourth flange; wherein the first end of said first elongated member is coupled to the fourth flange; wherein the first end of said second elongated member is coupled to the fourth flange; wherein said first spring is disposed on said first elongated member between said first flange and said second flange; and wherein said second spring is disposed on said second elongated member between said first flange and said second flange.

15. The electrical enclosure of claim 10 wherein said at least one mounting assembly is a first mounting assembly and a second mounting assembly; wherein the first one of said mounting elements of said first mounting assembly is coupled to the second side of said housing at or about the first end of said housing; and wherein the first one of said mounting elements of said second mounting assembly is coupled to the second side of said housing at or about the second end of said housing.

16. The electrical enclosure of claim 15 wherein said first mounting assembly and said second mounting assembly are substantially identical.

17. The electrical enclosure of claim 15 wherein said support structure is disposed opposite the second side of said housing; wherein the second mounting element of said first mounting assembly is structured to be coupled to said support structure above the first mounting element of said first mounting assembly; and wherein the second mounting element of said second mounting assembly is structured to be coupled to said support structure below the first mounting element of said second mounting assembly.

18. The electrical enclosure of claim 17 wherein the first edge of said housing is structured to be disposed opposite said electrical busway and generally perpendicular with respect to said support structure; wherein said number of coupling elements is a first coupling element and a second coupling element; wherein said first coupling element extends outwardly from the first edge of said housing at or about the first end of said housing; and wherein said second coupling element extends outwardly from the first edge of said housing at or about the second end of said housing.

* * * * *